United States Patent
Angelico et al.

(10) Patent No.: US 6,192,053 B1
(45) Date of Patent: Feb. 20, 2001

(54) ENHANCED ADJACENCY DETECTION PROTOCOL FOR WIRELESS APPLICATIONS

(75) Inventors: Dean Angelico, Pleasanton; James Alan Hayes, San Jose, both of CA (US)

(73) Assignee: Wireless Networks, Inc., San Mateo, CA (US)

( * ) Notice: Under 35 U.S.C. 154(b), the term of this patent shall be extended for 0 days.

(21) Appl. No.: 08/526,130

(22) Filed: Sep. 7, 1995

(51) Int. Cl.$^7$ ............................................. H04L 12/1413
(52) U.S. Cl. ............................................ 370/448; 370/462
(58) Field of Search .................... 370/445, 447, 370/448, 465, 469, 910

(56) References Cited

U.S. PATENT DOCUMENTS

| | | |
|---|---|---|
| 5,077,732 | 12/1991 | Fischer et al. . |
| 5,231,534 * | 7/1993 | Giles et al. ........................ 370/348 |
| 5,231,624 | 7/1993 | Giles et al. . |
| 5,274,841 * | 12/1993 | Natarajan et al. .................. 370/445 |
| 5,276,703 * | 1/1994 | Budin et al. ....................... 370/445 |
| 5,384,777 * | 1/1995 | Ahmadi et al. ..................... 370/447 |
| 5,502,724 * | 3/1996 | Chen et al. ........................ 371/445 |

OTHER PUBLICATIONS

Karn, P., "MACA—A New Channel Access Method for Packet Radio," (Conference Paper from Sep. 22, 1990 ARRL Conference in London, Ontario), pp. 134–140.

Chepponis, M., and Karn, P., "The KISS TNC: A Simple Host–to–TNC Communications Protocol," 6th ARRL Computer Networking Conference, Aug. 29, 1987, Redondo Beach, CA, pp. 38–43.

Karn, P., and Lloyd , B., "Link Level Protocols Revisited," Proceedings from the ARRL 5th Annual Computer Networking Conference, 1987., pp. 5.25–5.37.

Moy, J., Internet Engineering Task Force Network Working Group, RFC 1247, Jul. 1991, pp. 33–37.

* cited by examiner

Primary Examiner—Douglas W. Olms
Assistant Examiner—Ricky Q. Ngo
(74) Attorney, Agent, or Firm—Trial & Technology Law Group (57) ABSTRACT

An Adjacency Detection Protocol (ADP) whereby a node in a wireless network may collect information about its neighbors. The collected information enables the establishment of link layer connectivity between a node and its neighbors and also is useful for translating network layer addresses into link addresses. The collected information finds further use in preventing medium contention among adjacent nodes and in handling collisions.

4 Claims, 4 Drawing Sheets

LINK TABLE

| LINK LAYER ADDRESS (302) | LINK STATE (304) | PROCESSING SPEED (306) | SYSTEM LOAD (308) | INTERRUPT LATENCY (310) |
|---|---|---|---|---|
| | | | | |

ENHANCED ADJACENCY DETECTION PROTOCOL FOR WIRELESS APPLICATIONS

The present application is related to the subject matter of "CSMA with Dynamic Persistence", U.S. App. Ser. No. 08/525,239, filed Sept. 7, 1995, assigned to the assignee of this application and expressly incorporated by reference for all purposes now abandoned.

BACKGROUND OF THE INVENTION

The present invention relates generally to wireless data communications, and more particularly to a method and apparatus for establishing at a given wireless node, the availability of neighboring nodes for communications and certain characteristics of these neighboring nodes.

It is desirable to provide wireless data communications services comparable to those available via wired links. However, the physical limitations inherent in wireless communications prevent the ready adaptation of protocols developed in the wired context to wireless applications. In particular, protocols that require nodes in a network to collect and take advantage of information about the other nodes with which they may communicate do not readily transfer to the wireless context.

One example of a wired communications protocol unsuitable for wireless application is the CSMA/CD multiple access protocol commonly used to resolve shared media contention in local area networks (LANs). This link layer protocol takes advantage of so-called carrier sensing to reduce the frequency of collisions on a shared medium. When one node coupled to the shared medium is transmitting, other nodes can sense this and stay off the medium until it is free.

Radio-based protocols, despite relying on a shared medium, cannot usually rely on carrier sensing. In the first place, it is fairly difficult and time consuming to determine in a wireless context whether or not a transmitter is active. Furthermore, another obstacle to the successful application of carrier sensing techniques is that the physical medium used by wireless communications is not shared in the same sense as the LAN medium is shared. In the LAN context, a node that can talk to one node, can talk to and be heard by all nodes. In the wireless context, a node A may be able to communicate with a node B that itself can communicate with a node C while node A cannot itself communicate with node C. Thus, a transmission from node C to node B could interfere with a transmission from node A to node B, even though node A cannot hear node C and thus would not know to inhibit itself from transmitting while node C is transmitting. This is the so-called hidden terminal problem. If only node C can communicate with a node D, another problem would arise in that a transmission from B to A would inhibit a transmission from C to D even though D would not be able to hear B. This is the so-called exposed terminal problem.

Another such protocol unsuitable for wireless application is the Address Resolution Protocol (ARP). ARP is a network layer protocol belonging to the Internet Protocol (IP) suite and is widely used to translate IP addresses into LAN addresses. Typically, to support address translation by ARP, a node connected to a LAN that needs to translate an IP address into a LAN link layer address sends out an ARP broadcast message specifying the IP address. The LAN node having that IP address then responds to the ARP broadcast message with a message including the IP address and LAN address. Unfortunately, broadcasting ARP messages to acquire link layer addresses is impractical in the wireless context because all nodes cannot hear a single broadcast and thus the ARP messages would have to be endlessly relayed, causing congestion and degradation of network performance.

Other problems related to knowledge of neighboring nodes arise in the area of routing protocols. Protocols used to establish routing information in wired systems such as the Open Shortest Path First (OSPF) protocol used in IP require complex synchronization of routing information between adjacent nodes and do not take into account the less reliable nature of wireless links, in that some connections may be asymmetric (one way channel), and that wireless links in general will have a high bit error rate. Nor do they take into account that, for wireless links, transmission and processing delays vary on a per link basis.

SUMMARY OF THE INVENTION

The invention provides an Adjacency Detection Protocol (ADP) whereby a node in a wireless network may collect information about its neighbors. The collected information enables the efficient establishment of link layer connectivity between a node and its neighbors and also is useful for translating network layer addresses into link layer addresses. The collected information finds further use in preventing medium contention among adjacent nodes and in handling collisions.

According to a first aspect of the invention, a selected node in a wireless network listens for certain link layer protocol messages from its neighbors. The link layer protocol message may be a broadcast message sent out for this purpose, a targeted message sent to the selected node for this purpose, or a link layer protocol message having some other purpose. If one is received, the selected node creates an entry in a link table for the originating node, sets a timer, and sends a reply specifically addressed to the originating node. If an acknowledgement is received from the originating node prior to expiration of the timer, the link is marked as a good link.

The acknowledgement may include certain useful parameters of the originating node relating to its latency time in processing messages.

According to a second aspect of the invention, a protocol for resolving medium contention in a wireless network is enhanced by taking advantage of stored information about the message processing time of neighbors. A first node in the wireless network receives a packet from a second node that includes parameters relating to the second node's message processing time. Thereafter, when the first node overhears a ready-to-send packet sent by a third node to the second node, it responds by inhibiting its own transmitter for long enough to allow the second node to respond with a clear-to-send packet. In accordance with the invention, this inhibition time incorporates the second node's latency time. Alternatively, if the first node overhears a clear-to-send packet sent by a third node to the second node, it inhibits its own transmitter for long enough to allow the second node respond by transmitting data. This inhibition time also incorporates the second node's latency time.

According to a third aspect of the invention, a selected node in a wireless network collects network layer address information about its neighbors. When a link to a neighbor is created in accordance by the link layer, the network layer is notified of the new link and responds by invoking a network layer protocol that obtains network layer address information about the selected node. The network layer address information is then available to network layer protocols for routing and other purposes.

The invention will be better understood by reference to the following detailed description in connection with the accompanying drawings.

DESCRIPTION OF SPECIFIC EMBODIMENTS

Network Suitable for Implementing Present Invention

Figure 1:
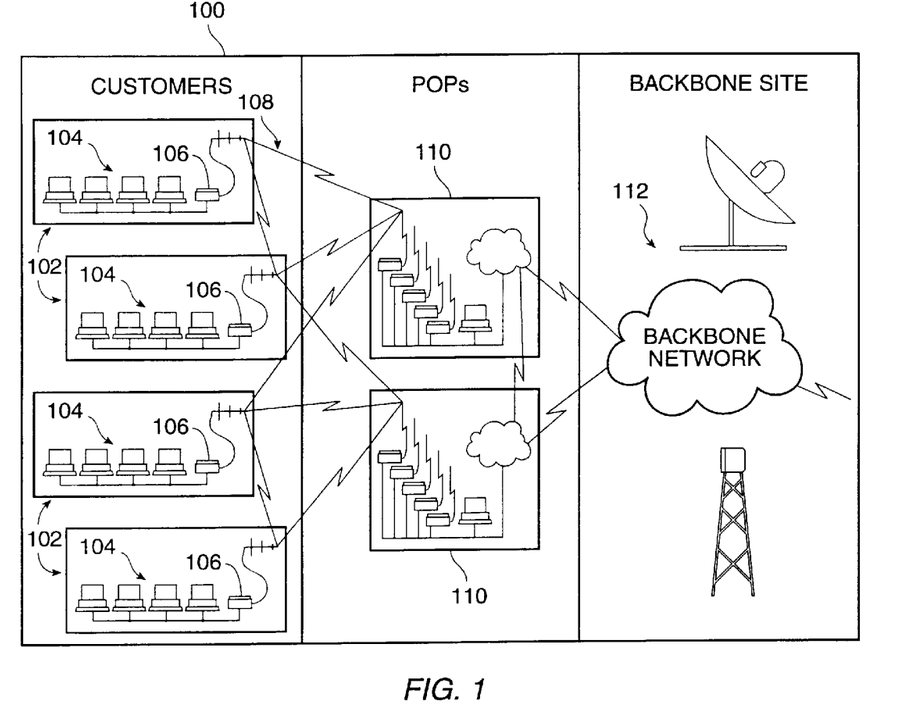
FIG. 1 depicts a representative wireless packet communication network suitable for implementing the present invention.

FIG. 1 depicts a representative wireless network 100 suitable for implementing the present invention. A plurality of local area networks (LANs) 102 each interconnect a number of host computers 104 and a single wireless router system 106. The wireless router systems 106 in turn are interconnected by a regional network 108 to multiple points of presence (POPs) 110 which serve as interconnects to a backbone network 112.

Host computers 104 may incorporate any processor or operating system DOS/Windows, Apple System 7, UNIX, OS/2, etc. but preferably support a TCP/IP protocol stack. LAN 102 is preferably of the well known Ethernet type. End user packets originating from a host computer 104 are routed via wireless router system 106 and regional network 108 to the nearest POP 110. This is either done directly when the wireless router system 106 is within rage of a POP 110, or done indirectly when that is not the case. Preferably, backbone network 108 is configured to require a maximum of three hops. The choices of frequency, modulation scheme etc. are not important to the present invention. Traffic from the POP is aggregated and ported out to a connection to backbone network 112, either via a wireline network, a high-speed radio link, or using microwave or satellite technology. Similarly, backbone network 112, which provides a long distance link that cross-connect regional networks could make use of wireline, microwave, or satellite technology.

The overall networking scheme described herein supports the transport of IP packets and thus enables host computers 104 to take advantage of Internet applications such as electronic mail, World Wide Web access, etc. despite the lack of a wired link to the Internet. Thus, particularly beneficial uses will be found in remote environments where wired connections are expensive or unavailable for other reasons. The networking scheme described herein will also find use in mobile applications.

Figure 2:
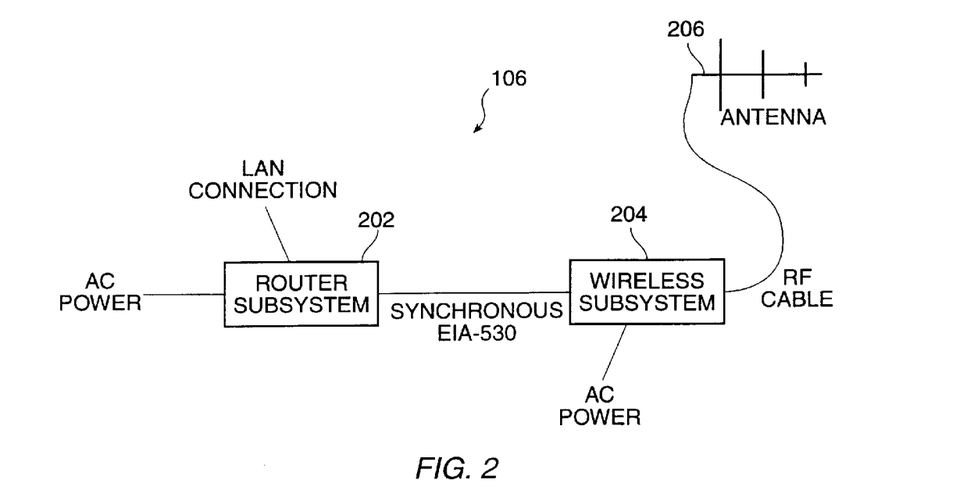
FIG. 2 is a simplified diagram of a wireless router system suitable for implementing the present invention.

FIG. 2 depicts wireless router system 106 in accordance with one embodiment of the invention. Wireless router system 106 includes a router subsystem 202, a wireless subsystem 204, and an antenna 206. Router subsystem 202 has an AC power input and a connection to LAN 102. The present embodiment of router subsystem 202 includes an IBM PC compatible motherboard with a networking capability to connect to the LAN. Networking protocols necessary to the implementation of regional network 108 including networking protocols of the present invention are stored as firmware.

Router subsystem 202 is connected to wireless subsystem 204 via the well-known synchronous EIA-530 interface. Wireless subsystem 204 itself has an AC power input and is connected to antenna 206 via an RF cable. Wireless subsystem 204 incorporates modulation/demodulation circuitry, a transceiver, and power amplification for the transmitted signal. The details of modulation, spectral allocation etc. are not important to the present invention. Also, not every router subsystem 202 need be associated with a LAN 102. Regional network 108 may also incorporate additional router subsystems 202 that are used exclusively for relaying packets to and from other routers or POPs. Router subsystems 202 can be understood to be nodes of regional network 108 and the terms "router subsystem", "router", and "node" will be used interchangeably herein.

Overview of the Preferred Embodiment

The preferred embodiment of the present invention is directed primarily toward the operation of router subsystems within regional network 108 to transport network layer packets. In the preferred embodiment, the network layer operates in accordance with IP, although other network layer protocols would be possible within the scope of the present invention. In order to permit the smooth operation of IP over regional network 108, several support functions are required. One essential function is the translation of IP addresses to the link layer addresses specific to the architecture of regional network 108. Another is collection of adjacency information about neighboring router subsystems. This adjacency information is essential to IP routing protocols.

The present invention provides an Adjacency Detection Protocol (ADP) suitable to wireless applications to collect information about adjacent routers. The information collected at each routing subsystem or node preferably includes the availability of links to adjacent nodes and message processing speed parameters of adjacent nodes. As will be explained below, this last parameter is particularly useful in resolving physical medium contention by competing nodes. The ADP also assists network layer protocols in the efficient collection of network layer address information about adjacent nodes. The ADP of the present invention preferably operates at the link layer of the well known seven layer model of digital communications, relying on the exchange of various link layer packets to collect the needed information.

Accumulation of Adjacency Information

The present invention provides a simple yet powerful protocol for accumulating information about adjacent nodes. Transmission of messages is minimized, greatly reducing implementation cost in the wireless context.

Figure 3:
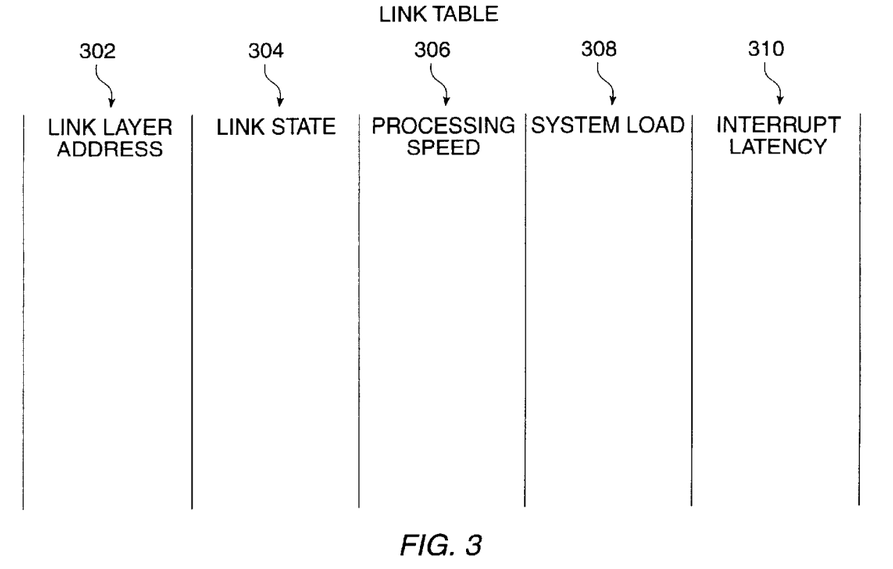
FIG. 3 depicts the organization of link information stored within a wireless node in accordance with one embodiment of the present invention.

FIG. 3 depicts a simplified representation of an electronically stored link table. Each link table entry preferably includes a link layer address 302 identifying an adjacent node, a state of the link 304, a measure 306 of the adjacent node's processing speed, a measure 308 of the adjacent node's system load and a measure 310 of interrupt latency. The link table is stored within each router system 202. Higher level IP routing and address translation protocols make use of the adjacency information stored in the link table of FIG. 3. As will be further described below, in accordance with the invention, a link layer protocol for preventing medium contention takes advantage of measures 306, 308, and 310.

An adjacent node having an entry marked with a GOOD state is one to which connections are possible. A CANDIDATE state indicates awareness of an adjacent node that is currently being evaluated for promotion to GOOD. A SUSPECT state indicates an adjacent node for which connection is still possible but if nothing is heard from that link for a predetermined time period, the link may be marked as DEAD. After a time, a DEAD link may be deleted from the link entry table. A node with no entry in the link table is described herein as being in the NO LINK state.

Figure 4:
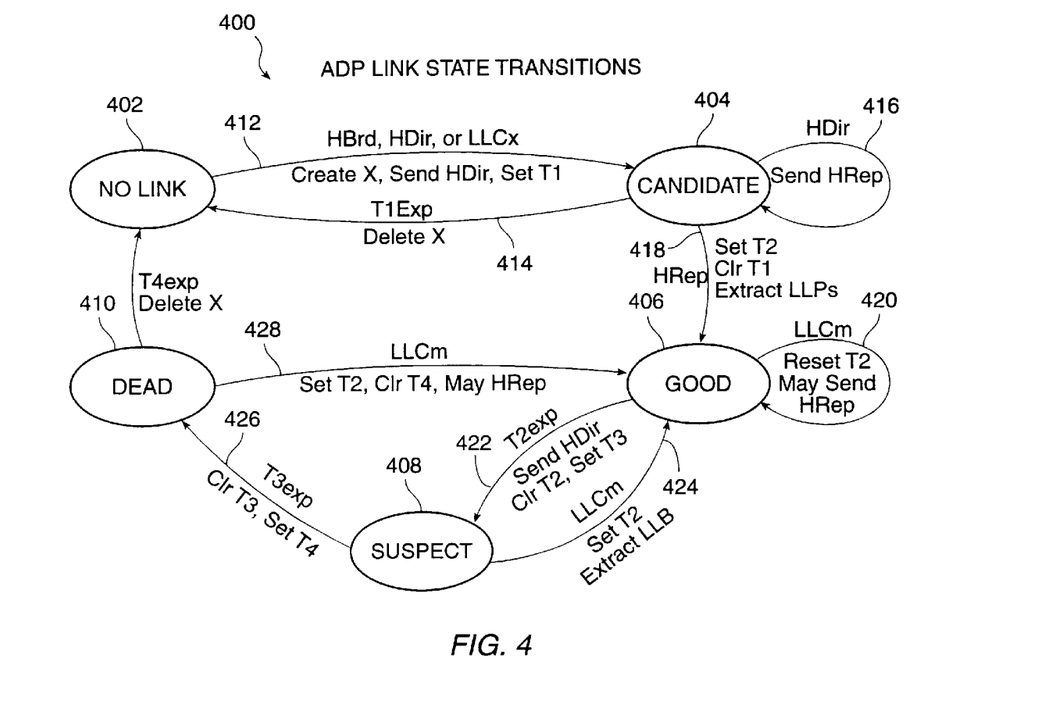
FIG. 4 depicts a transition diagram for a state machine that maintains a link table in accordance with one embodiment of the present invention.

The process by which the link table of FIG. 3 is maintained by the ADP will be discussed in detail with reference to FIG. 4. FIG. 4 depicts a transition diagram 400 for a state machine that maintains a link table in accordance with one embodiment of the present invention. The state machine of FIG. 4 is currently implemented in software though those of skill in the art will appreciate that a hardware implementation would also be possible within the scope of the present invention.

The following link layer messages are used to implement ADP.

HelloBroadcast: A message with NO destination link layer address.

HelloDirected: A message with a specific destination link layer address.

HelloReply: A message with a specific destination link layer address that also includes measures 306, 308, and 310 of the node sending the message. Measure 306 indicates processing speed and is determined by running a fixed loop of code. Measure 308 indicates system load and is determined by measuring a time between invocations of the lowest priority task. Measure 310 indicates interrupt latency, the time from when a hardware device requests service and to when the request is serviced, and is a value entered by an operator.

The following events at a selected node may trigger a transition either to another state or to the same state in the state machine of FIG. 4.

HBrd: Heard a HelloBroadcast from an adjacent node X.

HDir: Heard a HelloDirected addressed to this node.

HRep: Heard a HelloReply addressed to this node.

LLCm: Heard an link layer control (LLC) dialogue message addressed to this node from node X, and this message was a type which was in reply to something this node sent to X, implying that X heard this node. Examples of LLC dialogue messages include clear-to-send (CTS), return-to-send (RTS), acknowledge (ACK), and the HelloDirected and HelloReply messages.

LLCX: Heard an LLC dialog message from node X addressed to some other node.

Other events relate to the operation of timers maintained in connection with the state machine of FIG. 4.

T1exp: Timer T1 has expired.

T2exp: Timer T2 has expired.

T3exp: Timer T3 has expired.

T4exp: Timer T4 has expired.

A change in states in FIG. 4 may be accompanied by various actions.

"Set timer" signifies starting a particular timer with its timeout value when it is not currently running; when the time elapses, an expiration event is triggered.

"Clear timer" signifies stopping a timer without causing its expiration event trigger.

"Reset timer" signifies restarting a timer with its timeout value without triggering its expiration event.

"Set LLPs" means extracting and storing the remote node's processing parameters, such as processor speed, interrupt latency, and approximated traffic load.

There are four timers with the following timer values:

T1=60 seconds.

T2=60 seconds.

T3=60 seconds.

T4=3600 seconds.

With the above definitions understood, the operation of the state machine of FIG. 4 at a selected node may now be described in detail. As described above, the possible states are NO LINK 402, CANDIDATE 404, GOOD 406, SUSPECT 408, and DEAD 410. A line between states, or a line returning to the same state signifies a transition with the events triggering the transition and the actions associated with the transition being indicated by text written by the line.

An adjacent node begins in NO LINK state 402, that is with no link table entry. If a HelloBroadcast, HelloDirected, or LLCx message is heard from this adjacent node, the adjacent node is moved to CANDIDATE state 402, taking a transition 412 to the CANDIDATE state 404. Several actions are also taken. An entry, X, marked CANDIDATE, is created in the link table for this adjacent node. The selected node sends an HelloDirected message to this adjacent node and starts timer T1.

Once in CANDIDATE state 404, if T1 expires the adjacent node returns to NO LINK via a transition 414 and the link is deleted from the table. If the selected node receives a HelloDirected message from the adjacent node, it replies with a HelloReply that includes its processing parameters but the adjacent node returns to CANDIDATE state via a transition 416. This HelloReply assists the adjacent node in the preparation of its own link table.

If the selected node itself receives a HelloReply from the adjacent node while in CANDIDATE state 404, it responds by taking a transition 418 to GOOD state 406. It also clears timer T1 and sets timer T2. The HelloReply message includes the processing parameters including processor speed, service load, and operating system latency. These values are entered in the link table. Now connections may be made to the adjacent node.

Once in GOOD state 406, receipt of an LLCm message from the adjacent node will cause timer T2 to be set and continuation in GOOD state 406 via a transition 420. If the received LLCm message is a HelloDirected message, a HelloReply is sent to the adjacent node. Thus, periodic link activity maintains the link in GOOD state 406. If however, timer T2 expires, a transition 422 to SUSPECT state 408 occurs along with transmission of an HelloDirected message to the adjacent node, and setting of timer T3. Connection to the adjacent node remains possible in SUSPECT state 408.

If while in SUSPECT state 408, an LLCm message is received from the adjacent node, the adjacent node returns to CANDIDATE state 406 via a transition 424. If the LLCm message is a HelloReply, the processing parameters are extracted and stored in the link table. If the LLCm message is a HelloDirected, a HelloReply is sent to the adjacent node. Timer T2 is also set.

If, while in SUSPECT state 408, timer T3 expires, then the adjacent node takes a transition 426 to DEAD state 410. Timer T3 clears and timer T4 is set. Connections to an adjacent node in DEAD state 410 are not possible.

Once in DEAD state 410, if an LLCm message is received from the adjacent node, the adjacent node returns to CANDIDATE state 406 via a transition 428. If the LLCm message is a HelloDirected, a HelloReply is sent. If timer T4 expires, the adjacent node returns to NO LINK state 402 via transition 430 and its link entry is deleted.

Figure 5:
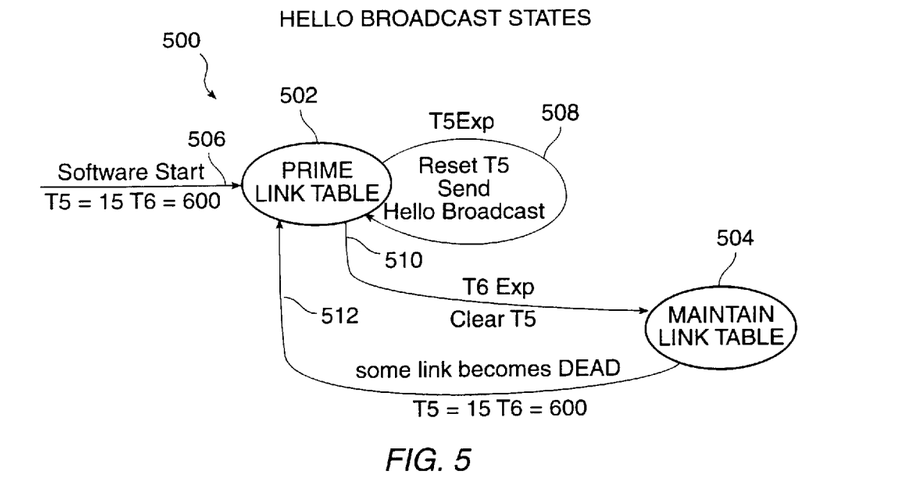
FIG. 5 depicts a transition diagram for a state machine that regulates the broadcast of certain messages in accordance with one embodiment of the present invention.

The above-described process assumes the periodic transmission of HelloBroadcast messages to accelerate completion and updating of the link table. FIG. 5 depicts a transition diagram 500 for a state machine that regulates the transmission of HelloBroadcast messages in accordance with one embodiment of the present invention. There are two states, a PRIME LINK TABLE state 502 and a MAINTAIN LINK TABLE state 504. In PRIME LINK TABLE state 502, HelloBroadcasts are periodically transmitted to accelerate updating of the link table. In MAINTAIN LINK TABLE state 504, HelloBroadcasts are not transmitted. The link table will continue to be modified since messages will be received from adjacent nodes.

Referring now to FIG. 5, when the link layer control software of a selected node starts, PRIME LINK TABLE state 502 is entered via a transition 506. Furthermore, timer T5 is set to 15 seconds and timer T6 is set to 600 seconds. Once in PRIME LINK TABLE state 502, if T5 expires, a HelloBroadcast is sent out. The selected node then returns to PRIME LINK TABLE 502 state via a transition 508 and resets timer T5. If T6 expires, the selected node moves to MAINTAIN LINK TABLE state 504 via a transition 510 and clears timer T5. The selected node remains in MAINTAIN LINK TABLE state 504 until any of the links in the link table transitions to DEAD state 410. Once this happens, timer T5 is set to 15 seconds, timer T2 is set to 600 seconds, and the selected node returns to PRIME LINK TABLE state via a transition 512.

Providing Link Layer to Network Layer Connectivity

The present invention also provides a method and apparatus for collecting network layer address information about adjacent nodes without the use of broadcast messages. Once a link to an adjacent node is established, the network layer is notified and a network layer protocol is invoked to identify the network layer address of the adjacent node. The network layer address is stored with the link layer address of the adjacent node in an address resolution table. The address resolution table facilitates translation from network layer addresses to link layer addresses. In the preferred embodiment, the network layer operates in accordance with IP and the network layer protocol invoked is Reverse Address Resolution Protocol (RARP).

Figure 6:
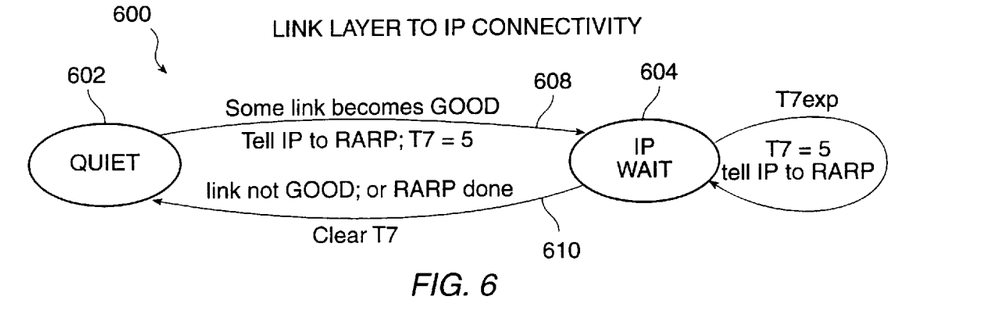
FIG. 6 depicts a transition diagram for a state machine that regulates the collection of network layer address information in accordance with one embodiment of the present invention.

FIG. 6 depicts a transition diagram 600 for a state machine that regulates the collection of network layer address information for a particular adjacent node in accordance with one embodiment of the present invention. Like the state machines of FIGS. 4–5, the state machine of FIG. 6 is operative at the link layer. There are two states for each adjacent node, a QUIET state 602, and an IP WAIT state 604. Operation begins in the QUIET state. Once a link to any adjacent node transitions to GOOD state 406, the adjacent node transitions to IP WAIT state 604 via a transition 606. The network layer (IP in the preferred embodiment) is notified to take action to discover the network layer address of the new adjacent node and a timer T7 is set to 5 seconds. In the preferred embodiment, the action taken by the network layer is invocation of Reverse Address Resolution Protocol (RARP) to discover the IP address of the adjacent node via an exchange of IP layer messages.

Once in IP WAIT state 604, if T7 expires before there is any indication that RARP has successfully acquired the needed IP address, it is reset, and the network layer is notified to repeat the RARP operation. The IP WAIT state continues via a transition 608. This step of repeating is necessary because the IP layer will not automatically repeat the RARP operation if the IP address is not successfully acquired for some reason. The link layer thus operates to keep repeating the RARP operation until the IP address of the adjacent node is successfully acquired. If RARP successfully acquires the needed IP address, or if the adjacent node leaves GOOD state 606, timer T7 is cleared and a transition 610 is taken to QUIET state 602.

Applying Message Processing Time to Resolving Medium Contention

In accordance with the invention, the processing parameters collected by ADP are used to optimize the performance of link layer protocols used to prevent collisions, i.e., simultaneous transmissions by competing nodes on the same radio channel. While one node is transmitting, other nodes can sense this and inhibit transmission until the common medium is free. The application of carrier sensing to wireless network raises certain problems however.

Figure 7A:
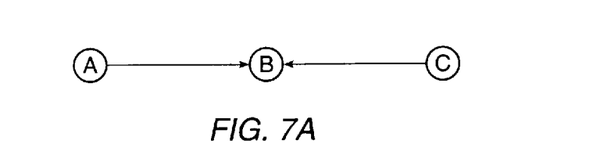
FIGS. 7A–7B depict problems raised by the application of carrier sensing to wireless networks.

FIG. 7A depicts the classic hidden terminal problem raised by the application of carrier sensing to wireless networks. A node A may be able to communicate with a node B that itself can communicate with a node C while node A cannot itself communicate with node C. Thus, a transmission from node C to node B could interfere with a transmission from node A to node B, even though node A cannot hear node C and thus would not know to inhibit itself from transmitting while node C is transmitting.

Figure 7B:
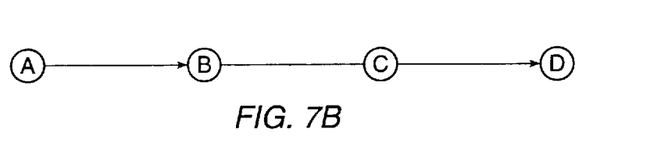

FIG. 7B depicts the classic exposed terminal problem raised by the application of carrier sensing to wireless networks. If only node C can communicate with a node D, a problem arises in that a transmission from B to A would inhibit a transmission from C to D even though D would not be able to hear B.

In recognition of these problems, an alternative scheme for resolving medium contention in wireless networks has been described in P. Karn, MACA—A New Channel Access Method for Packet Radio, (Conference Paper from Sept. 22, 1990 ARRL Conference in London, Ontario), the contents of which are herein expressly incorporated by reference for all purposes. Therein is disclosed the so-called MACA (Multiple Access with Collision Avoidance) technique, a method for avoiding collisions without relying on carrier sensing.

In accordance with the MACA method, a node with data to transmit sends a ready-to-send (RTS) packet to the desired destination node. The RTS packet includes the amount of data to be transmitted. The destination node then responds with a clear-to-send (CTS) packet that also includes the amount of data to be transmitted. Any other node overhearing the RTS packet inhibits its own transmission for long enough to allow the destination node to respond with a CTS packet. Any other node overhearing the CTS packet inhibits its own transmission long enough for the data to be transmitted.

The present invention provides an enhanced technique for determining the proper inhibition times that takes advantage of the processing parameter information collected concerning adjacent nodes. The inhibition times thus take into account the processing speed and traffic loads of the adjacent nodes. Since inhibition times are more accurate, the frequency of collisions is further reduced while maintaining efficient usage of available radio channels.

Recalling from the discussion in reference to FIG. 3, each node stores various indicia of processing speed for the neighbors to which it has active links. These include measures of raw processing speed, system load, and interrupt latency. The calculation of overall message processing latency time takes into account these factors as well as an estimate of propagation time.

In the preferred embodiment of the present invention, the three message processing parameters are received from the adjacent nodes as independent values. A single value incorporating the sum of the three indicia could also be sent but sending the parameters separately facilitates troubleshooting of adjacent nodes.

Figure 8:
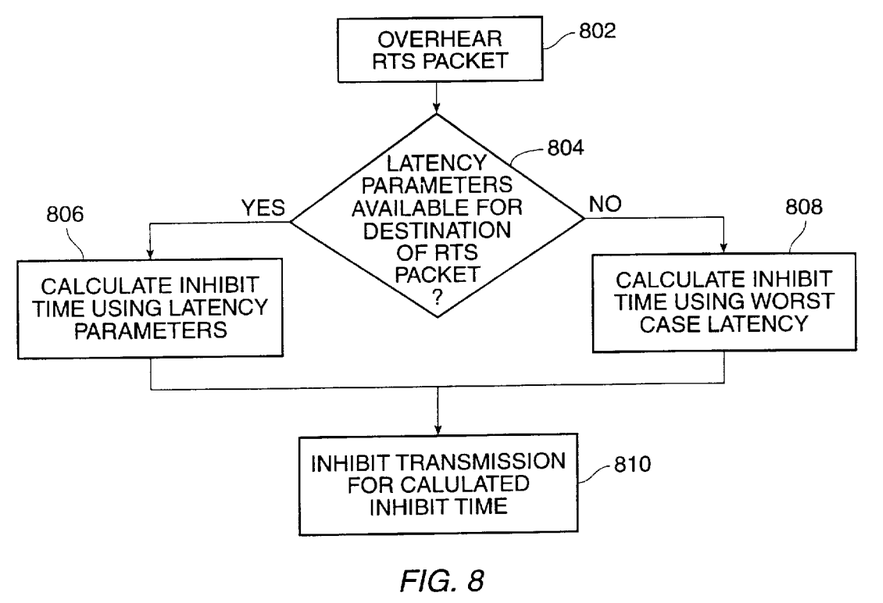
FIG. 8 is a flowchart describing the steps of responding to an overheard RTS packet in accordance with one embodiment of the present invention.

FIG. 8 is a flowchart describing the steps of responding to an overheard RTS packet in accordance with one embodiment of the present invention. At step 802, a first node overhears a RTS packet from a second node to a third node. The first node must now determine for how long to inhibit its own transmissions to allow the third node to respond.

At step 804, the first node checks to see if it has an entry to its link table for the third node that includes the processing parameters of the third node. At step 806, if processing parameters are available for the third node, an inhibition time is calculated by summing these parameters with a worst case estimated propagation time of 53 microseconds which represents a propagation delay of 5.3 microseconds per mile over 10 miles. At step 808, if processing parameters are not available for the third node, e.g., because there is no link to the third node, the inhibition time is calculated by summing a worst case operating system latency of 1.2 milliseconds with the worst case propagation time of 53 microseconds. At step 810, transmission is inhibited for the calculated time.

Figure 9:
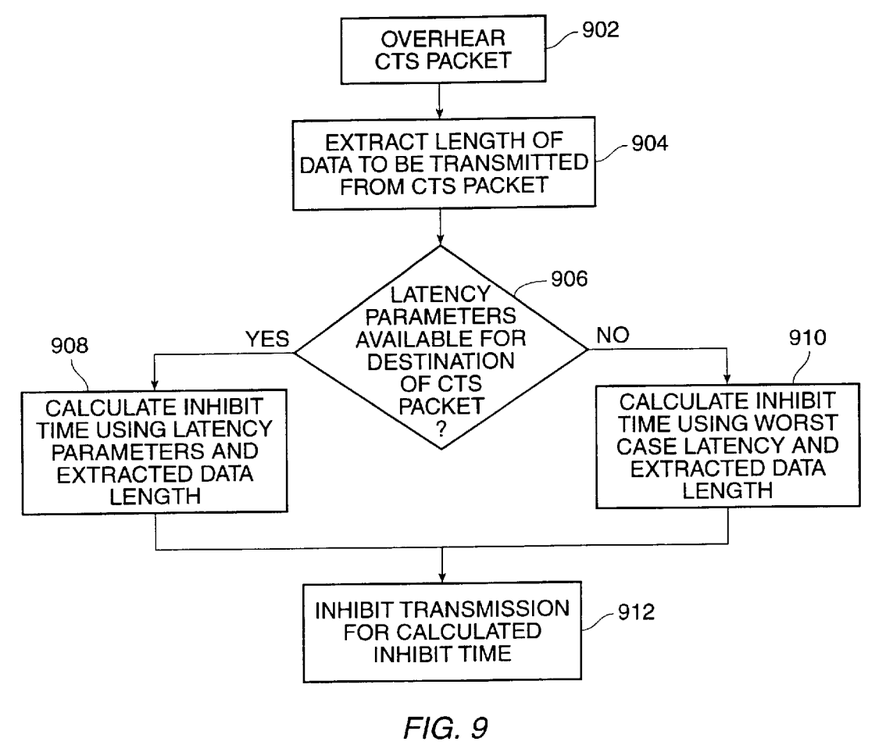
FIG. 9 is a flowchart describing the steps of responding to an overheard CTS packet in accordance with one embodiment of the present invention.

FIG. 9 is a flowchart describing the steps of responding to an overheard CTS packet in accordance with one embodiment of the present invention. At step 902, a first node overhears a CTS packet from a second node to a third node. The first node must now determine for how long to inhibit its own transmissions to allow the third node to respond.

At step 904, the first node extracts the amount of data to be sent from the CTS packet. At step 906, the first node checks to see if it has an entry to its link table for the third node that includes the processing parameters of the third node. At step 908, if processing parameters are available for the third node, an inhibition time is calculated by summing these parameters with a worst case estimated propagation time of 53 microseconds which represents a propagation delay of 5.3 microseconds per mile over 10 miles and with the time necessary to transmit the length of data obtained in step 904. At step 910, if processing parameters are not available for the third node, e.g., because there is no link to the third node, the inhibition time is calculated by summing a worst case operating system latency of 1.2 milliseconds with the worst case propagation time of 53 microseconds and the time needed to transmit the length of data obtained in step 904. At step 912, transmission is inhibited for the calculated time.

The application of the processing parameters to resolving collisions once they occur is discussed in "CSMA with Dynamic Persistence", U.S. Application Ser. No. 08/525,239, assigned to the assignee of the present application now abandonded.

As will be understood by those familiar with the art, the present invention may be embodied in other specific forms without departing from the spirit or essential characteristics thereof. Accordingly, reference should be made to the appended claims which set forth the scope of the present invention.

What is claimed is:

1. In a wireless packet communication network comprising a plurality of nodes, a method for preventing contention over a shared communications medium comprising the steps of:

receiving, at a first node, a packet from a second node including an estimated receiver processing delay of said second node; thereafter overhearing, at said first node, a request to send (RTS) packet sent from a third node and addressed to said second node; thereafter inhibiting transmission from said first node in response to said RTS packet for a time period, wherein said time period represents an estimate of time required at said third node to reply to said RTS packet with a clear-to-send (CTS) packet and is determined in accordance with said estimated receiver processing delay, and transmitting said CTS packet from said third node to said second node during said time period.

2. In a wireless packet communication network comprising a plurality of nodes, a method for preventing contention over a shared communications medium comprising the steps of:

receiving, at a first node, a packet from a second node including an estimated receiver processing delay of said second node; thereafter overhearing, at said first node, a clear to send (CTS) packet sent from a third node and addressed to said second node, said CTS packet including a length of data to be transmitted from said second node to said third node; thereafter inhibiting transmission from said first node in response to said CTS packet for a time period, wherein said time period is determined in accordance with said length of data and said estimate receiver processing delay, and transmitting data from said second node to said third node during said time period.

3. A first node adapted to selectively discontinue transmission in a wireless communication network, said first node comprising:

means for receiving a packet from a second node including an estimated receiver processing delay;

means for overhearing a request to send (RTS) packet sent from a third node and addressed to said second node;

means for inhibiting transmission from said first node in response to said RTS packet for a time period, wherein said time period represents an estimate of time required at said third node to reply to said RTS packet with a clear-to-send packet and is determined in accordance with said estimated receiver processing delay, and means for transmitting said CTS packet from said third node to said second node during said time period.

4. A first node adapted to selectively discontinue transmission in a wireless communication network, said first node comprising:

means for receiving a packet from a second node including an estimated receiver processing delay of said second node;

means for overhearing a clear to send (CTS) packet sent from a third node and addressed to said second node, said CTS packet including a length of data to be transmitted from said second node to said third node;

means for inhibiting transmission from said first node in response to said CTS packet for a time period, wherein said time period is determined in accordance with said length of data and said estimated receiver processing delay of said second node, and means for transmitting data from said second node to said third node during said time period.

* * * * *